United States Patent
Okunishi et al.

(10) Patent No.: US 12,304,490 B2
(45) Date of Patent: May 20, 2025

(54) CONTROL DEVICE

(71) Applicant: HONDA MOTOR CO., LTD., Tokyo (JP)

(72) Inventors: Shinichi Okunishi, Saitama (JP); Tatsuya Konishi, Saitama (JP); Keita Akiho, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 195 days.

(21) Appl. No.: 18/113,843

(22) Filed: Feb. 24, 2023

(65) Prior Publication Data

US 2023/0303079 A1 Sep. 28, 2023

(30) Foreign Application Priority Data

Mar. 25, 2022 (JP) ................................. 2022-050616

(51) Int. Cl.
*B60W 30/18* (2012.01)
*B60W 60/00* (2020.01)

(52) U.S. Cl.
CPC .... *B60W 30/18163* (2013.01); *B60W 60/001* (2020.02); *B60W 2420/408* (2024.01); *B60W 2554/20* (2020.02); *B60W 2554/80* (2020.02)

(58) Field of Classification Search
None
See application file for complete search history.

(56) References Cited

U.S. PATENT DOCUMENTS

| | | | | |
|---|---|---|---|---|
| 8,436,902 B2 * | 5/2013 | Kuehnle | ................. | G01W 1/14 348/148 |
| 8,605,947 B2 * | 12/2013 | Zhang | .................... | G08G 1/167 348/148 |
| 8,665,079 B2 * | 3/2014 | Pawlicki | ............... | G01S 13/867 340/436 |
| 8,861,791 B2 * | 10/2014 | You | ...................... | G06V 20/588 382/104 |
| 9,352,777 B2 * | 5/2016 | Lavoie | ................... | H04N 7/183 |

(Continued)

FOREIGN PATENT DOCUMENTS

JP 2007-017338 A 1/2007
JP 2015-232866 A 12/2015

(Continued)

OTHER PUBLICATIONS

Sep. 5, 2023, translation of Japanese Office Action issued for related JP Application No. 2022-050616.

*Primary Examiner* — Jonathan M Dager
(74) *Attorney, Agent, or Firm* — Paratus Law Group, PLLC

(57) ABSTRACT

A control device that performs travel control of a vehicle, includes a processor configured to acquire output information of a sensor configured to detect an object in an around of the vehicle based on a reflected wave from the object. The processor is configured to: acquire detection point data of the object in a peripheral region of the vehicle based on the output information of the sensor; and recognize that a peripheral environment of the vehicle is a travel-restricted section based on a distribution of detection point data in a first group including a plurality pieces of the detection point data on one side in a left-right direction of the vehicle in the peripheral region.

8 Claims, 10 Drawing Sheets

(56) References Cited

U.S. PATENT DOCUMENTS

| | | | | |
|---|---|---|---|---|
| 9,506,774 | B2* | 11/2016 | Shutko | B60W 50/14 |
| 9,536,155 | B2* | 1/2017 | Takemae | G08G 1/167 |
| 9,631,936 | B2* | 4/2017 | Shashua | G01C 21/3602 |
| 9,981,662 | B2* | 5/2018 | Lavoie | B60W 10/06 |
| 10,246,086 | B2* | 4/2019 | Tijerina | B60W 30/06 |
| 10,345,822 | B1* | 7/2019 | Parchami | G05D 1/0251 |
| 10,501,078 | B2* | 12/2019 | Kishi | B60W 60/0023 |
| 10,940,868 | B2* | 3/2021 | Asakura | B60W 50/14 |
| 11,024,051 | B2* | 6/2021 | Gomezcaballero | G06T 7/70 |
| 11,034,364 | B1* | 6/2021 | Narang | G06N 20/00 |
| 11,136,037 | B2* | 10/2021 | Saikyo | B60Q 9/00 |
| 11,216,004 | B2* | 1/2022 | Liang | G06F 18/2414 |
| 11,541,910 | B1* | 1/2023 | Ganguli | B60Q 5/006 |
| 12,077,186 | B1* | 9/2024 | Schleede | B60W 60/0016 |
| 12,233,872 | B2* | 2/2025 | Chikamori | B60W 30/182 |
| 2006/0132295 | A1* | 6/2006 | Gern | B60Q 9/008 |
| | | | | 340/438 |
| 2007/0010937 | A1 | 1/2007 | Sakuma | |
| 2011/0184605 | A1* | 7/2011 | Neff | G05D 1/0231 |
| | | | | 701/25 |
| 2012/0101713 | A1* | 4/2012 | Moshchuk | B60W 40/064 |
| | | | | 701/301 |
| 2012/0288154 | A1* | 11/2012 | Shima | G06T 7/174 |
| | | | | 382/103 |
| 2013/0151058 | A1* | 6/2013 | Zagorski | G05D 1/0289 |
| | | | | 701/1 |
| 2014/0032049 | A1* | 1/2014 | Moshchuk | G08G 1/166 |
| | | | | 701/42 |
| 2016/0339880 | A1* | 11/2016 | Svensson | B60W 30/09 |
| 2017/0291603 | A1* | 10/2017 | Nakamura | B60W 30/09 |
| 2017/0329332 | A1* | 11/2017 | Pilarski | B60W 30/0956 |
| 2017/0349183 | A1* | 12/2017 | Sen | B60K 35/90 |
| 2018/0233034 | A1* | 8/2018 | Tachibana | G08G 1/052 |
| 2019/0018410 | A1 | 1/2019 | Ando | |
| 2019/0135291 | A1* | 5/2019 | Sim | B60W 10/188 |
| 2019/0202451 | A1* | 7/2019 | Hayamizu | B60W 10/18 |
| 2019/0213290 | A1* | 7/2019 | Delva | G01M 17/007 |
| 2019/0217703 | A1* | 7/2019 | Uejima | B60W 30/18163 |
| 2019/0276013 | A1* | 9/2019 | Kim | B60W 30/09 |
| 2019/0286926 | A1* | 9/2019 | Miura | G06V 20/588 |
| 2019/0291730 | A1* | 9/2019 | Kamiya | G06V 20/58 |
| 2019/0294170 | A1* | 9/2019 | Kazemi | G05D 1/0221 |
| 2019/0369626 | A1* | 12/2019 | Lui | G05D 1/0221 |
| 2020/0062245 | A1* | 2/2020 | Samotsvet | G06T 7/60 |
| 2020/0064855 | A1* | 2/2020 | Ji | G05D 1/0246 |
| 2020/0066147 | A1* | 2/2020 | Vadillo | H04W 84/18 |
| 2020/0150652 | A1* | 5/2020 | Urano | G05D 1/0061 |
| 2020/0198649 | A1* | 6/2020 | Emura | G05B 13/0265 |
| 2020/0223437 | A1* | 7/2020 | Satou | B60R 21/00 |
| 2020/0249684 | A1* | 8/2020 | Onofrio | G08G 1/167 |
| 2020/0257299 | A1* | 8/2020 | Wang | G08G 1/167 |
| 2020/0355823 | A1* | 11/2020 | Tingley | G01S 13/931 |
| 2021/0046936 | A1* | 2/2021 | Umeda | B60W 10/20 |
| 2021/0061270 | A1* | 3/2021 | Parks | B60W 10/18 |
| 2021/0094539 | A1* | 4/2021 | Beller | G05D 1/0214 |
| 2021/0094575 | A1* | 4/2021 | Sato | B60W 30/16 |
| 2021/0107567 | A1* | 4/2021 | Varunjikar | G01S 15/931 |
| 2021/0129835 | A1* | 5/2021 | Viehmann | G06V 20/588 |
| 2021/0129865 | A1* | 5/2021 | Jeong | G08G 1/162 |
| 2021/0190536 | A1* | 6/2021 | Gil Casals | G01C 21/3841 |
| 2021/0206389 | A1* | 7/2021 | Kim | G01C 21/3885 |
| 2021/0237739 | A1* | 8/2021 | Hayakawa | B60W 60/001 |
| 2021/0253128 | A1* | 8/2021 | Nister | B60W 60/0027 |
| 2021/0276588 | A1* | 9/2021 | Kabzan | B60W 10/04 |
| 2021/0300419 | A1* | 9/2021 | Matsunaga | B60W 60/0018 |
| 2021/0300420 | A1* | 9/2021 | Matsunaga | G06V 20/588 |
| 2021/0309217 | A1* | 10/2021 | Kim | G08G 1/165 |
| 2021/0309227 | A1* | 10/2021 | Jang | B60W 30/18163 |
| 2021/0331671 | A1 | 10/2021 | Kumano et al. | |
| 2021/0383138 | A1* | 12/2021 | Ma | G06V 20/58 |
| 2022/0009522 | A1* | 1/2022 | Zhang | B60W 30/12 |
| 2022/0017079 | A1* | 1/2022 | Kakeshita | B60W 30/0956 |
| 2022/0017080 | A1* | 1/2022 | Moriya | B60W 30/09 |
| 2022/0017081 | A1* | 1/2022 | Yokoyama | G06T 7/254 |
| 2022/0048499 | A1* | 2/2022 | Yang | B60W 10/08 |
| 2022/0063664 | A1* | 3/2022 | Liu | B60W 10/18 |
| 2022/0063669 | A1* | 3/2022 | Fukushige | B60W 40/08 |
| 2022/0073095 | A1* | 3/2022 | Seitz | B60W 40/09 |
| 2022/0080977 | A1* | 3/2022 | Ucar | B60W 40/09 |
| 2022/0089186 | A1* | 3/2022 | Gotou | B60W 10/20 |
| 2022/0105931 | A1* | 4/2022 | Motegi | G06V 20/56 |
| 2023/0140569 | A1* | 5/2023 | Foster | B60W 60/0017 |
| | | | | 701/400 |
| 2023/0303119 | A1* | 9/2023 | Liu | B60W 30/18163 |
| 2024/0318969 | A1* | 9/2024 | Nimura | G01C 21/3461 |

FOREIGN PATENT DOCUMENTS

| | | |
|---|---|---|
| JP | 2019-020782 A | 2/2019 |
| JP | 2019-156192 A | 9/2019 |
| JP | 2020-112417 A | 7/2020 |
| WO | WO 2022/050006 A1 | 3/2022 |

* cited by examiner

FIG. 4

| DRIVING MODE | CONTROL STATE | TASK |
|---|---|---|
| FIRST DRIVING MODE | AUTOMATIC DRIVING | FRONT MONITORING: UNNECESSARY STEERING GRIPPING: UNNECESSARY |
| SECOND DRIVING MODE | DRIVING ASSISTANCE | FRONT MONITORING: NECESSARY STEERING GRIPPING: UNNECESSARY |
| THIRD DRIVING MODE | DRIVING ASSISTANCE | FRONT MONITORING: NECESSARY STEERING GRIPPING: NECESSARY |
| FOURTH DRIVING MODE | DRIVING ASSISTANCE | FRONT MONITORING: NECESSARY AT LEAST CERTAIN DEGREE OF DRIVING OPERATION IS NECESSARY |
| FIFTH DRIVING MODE | MANUAL DRIVING | FRONT MONITORING: NECESSARY DRIVING OPERATION IS REQUIRED FOR BOTH STEERING AND ACCELERATION AND DECELERATION |

TASK: LIGHT ↑
TASK: HEAVY ↓

CONTROL DEVICE

CROSS-REFERENCE TO RELATED APPLICATIONS

The present application claims the benefit of priority of Japanese Patent Application No. 2022-050616, filed on Mar. 25, 2022, the content of which is incorporated herein by reference.

TECHNICAL FIELD

The present disclosure relates to a control device.

BACKGROUND ART

In recent years, introduction of automatic driving and driving assistance of vehicles is rapidly progressing. As a technique for the automatic driving and the driving assistance of the vehicles, a technique such as auto lane changing (ALC) has been developed in which the vehicle changes lanes even when a driver does not perform an operation such as steering.

JP-A-2019-156192 discloses a vehicle control device including an external environment recognition unit that recognizes a surrounding state of a host vehicle, an action plan unit that determines an action to be performed by the host vehicle based on a recognition result of the external environment recognition unit, and a vehicle control unit that performs travel control of the host vehicle based on a determination result of the action plan unit.

As in JP-A-2019-156192, it is important to recognize a section in which traveling is restricted on a road (in the present specification, the section is defined as a travel-restricted section), such as a section in which lane regulation is performed due to construction work, an accident, or the like in order to improve safety when the travel control of the vehicle is performed.

SUMMARY

An object of the present disclosure is to improve safety. Further, the present disclosure contributes to development of a sustainable transportation system by further improving safety of traffic.

According to an aspect of the present disclosure, there is provided a control device that performs travel control of a vehicle, the control device including a processor configured to acquire output information of a sensor configured to detect an object in an around of the vehicle based on a reflected wave from the object, where the processor is configured to: acquire detection point data of the object in a peripheral region of the vehicle based on the output information of the sensor; and recognize that a peripheral environment of the vehicle is a travel-restricted section based on a distribution of detection point data in a first group including a plurality pieces of the detection point data on one side in a left-right direction of the vehicle in the peripheral region.

According to the present disclosure, safety of the vehicle can be improved.

BRIEF DESCRIPTION OF THE DRAWINGS

FIG. 4 is a diagram illustrating specific examples of a driving mode.

DESCRIPTION OF EMBODIMENTS

Figure 1:
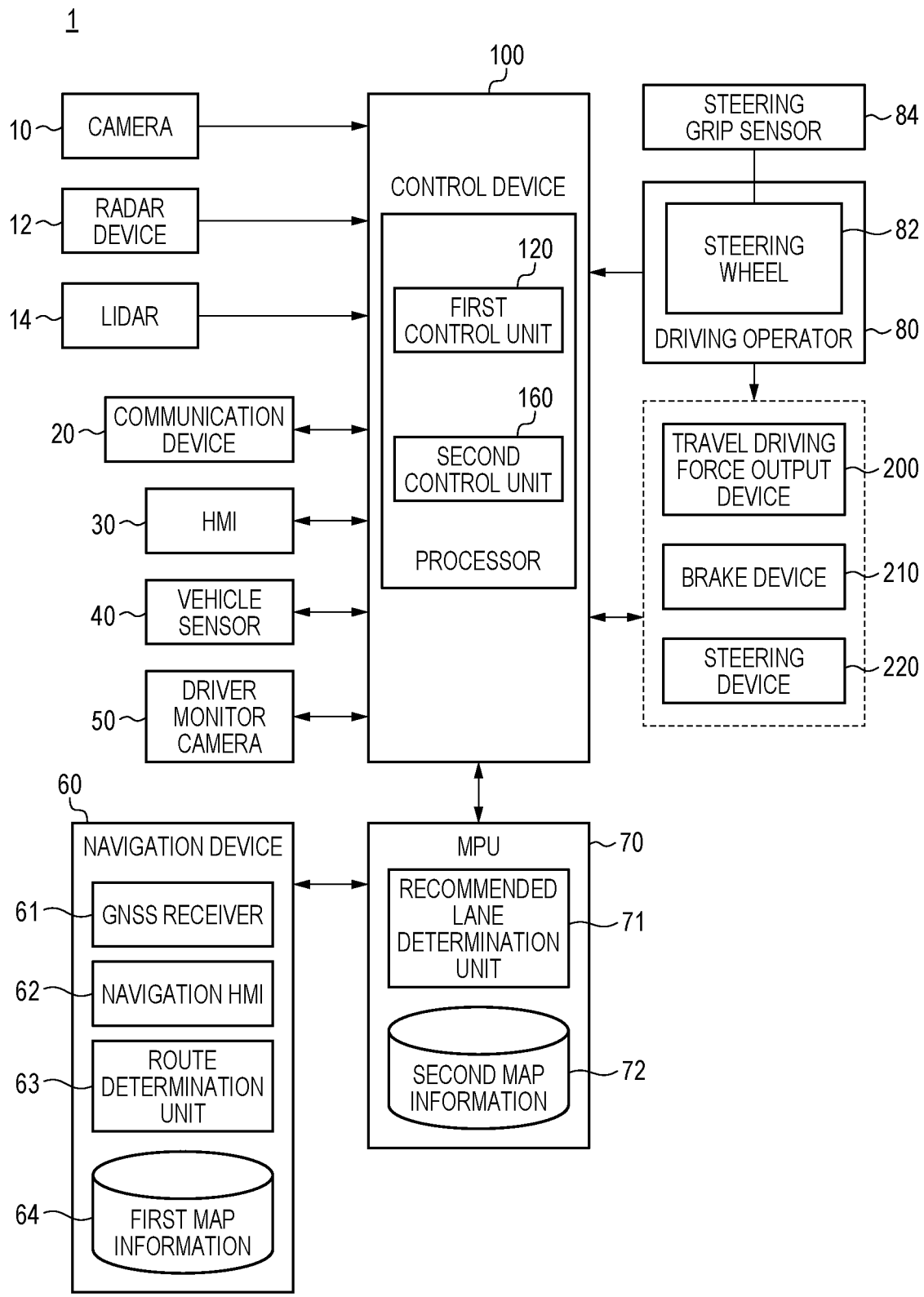
FIG. 1 is a block diagram illustrating an overall configuration of a vehicle system 1 on which a control device 100 is mounted.

Hereinafter, a vehicle system 1 including a control device 100 according to an embodiment of the present disclosure will be described with reference to the drawings. The drawings are viewed in directions of reference numerals. In the present specification, in order to simplify and clarify the description, front, rear, left, and right directions are described in accordance with directions viewed from a driver of a vehicle M illustrated in FIG. 2. In the drawings, a front side of the vehicle M is represented by Fr, a rear side thereof is represented by Rr, a left side thereof is represented by L, and a right side thereof is represented by R.

<Overall Configuration of Vehicle System 1>

Figure 2:
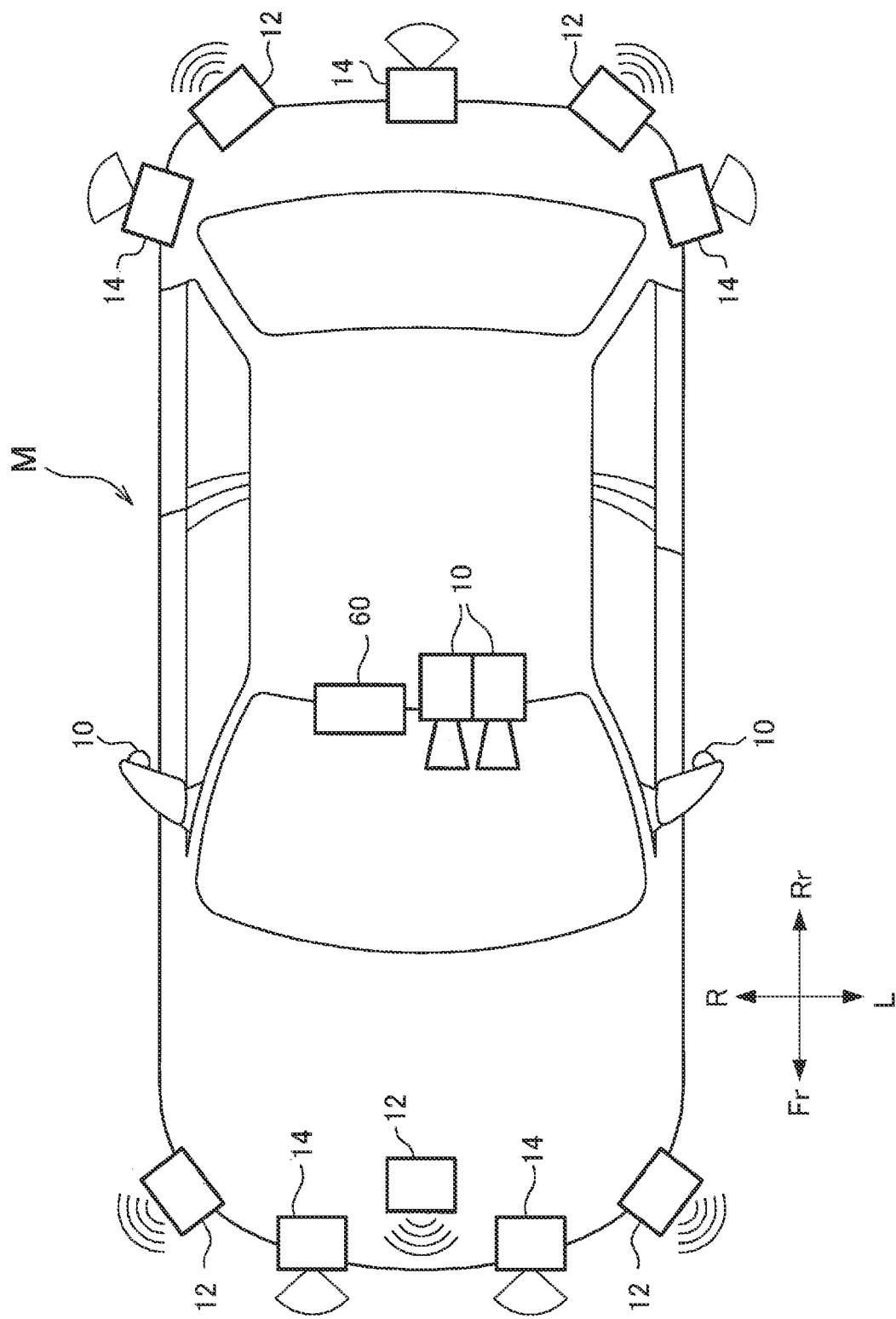
FIG. 2 is a schematic view illustrating an example of an external configuration of a vehicle M included in the vehicle system 1.

FIG. 1 is a block diagram illustrating an overall configuration of the vehicle system 1 on which the control device 100 is mounted. FIG. 2 is a schematic view illustrating an external configuration example of the vehicle M included in the vehicle system 1. The vehicle M is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates by using electric power generated by a generator connected to the internal combustion engine or electric power discharged from a secondary battery or a fuel cell FIG. 2 illustrates the example in which the vehicle M is a four-wheeled vehicle.

The vehicle system 1 includes, for example, cameras 10, radar devices 12, light detection and ranging (LIDAR) 14, a communication device 20, a human machine interface (HMI) 30, a vehicle sensor 40, a driver monitor camera 50, a navigation device 60, a map positioning unit (MPU) 70, a driving operator 80, the control device 100, a travel driving force output device 200, a brake device 210, and a steering device 220. These apparatuses and devices are connected to one another by a multiplex communication line such as a controller area network (CAN) communication line, a serial communication line, a wireless communication network, or the like.

The camera 10 is, for example, a digital camera using an imaging element such as charge coupled device (CCD) or a complementary metal oxide semiconductor (CMOS). The camera 10 is attached to an optional place of the vehicle M.

For example, as illustrated in FIG. 2, the cameras 10 are provided in the vicinity of a rearview mirror (not illustrated) in a vehicle interior of the vehicle M, and in a front portion of a right door and a front portion of a left door in a vehicle exterior of the vehicle M. Image information (output information of the cameras 10) on a front side, a right rear side, and a left rear side in a traveling direction of the vehicle M captured by the camera 10 is transmitted to the control device 100.

The radar device 12 emits radio waves such as millimeter waves to the around of the vehicle M, detects radio waves (reflected waves) reflected by the object, and outputs information (hereinafter, also referred to as detection point data) on a position (hereinafter, also referred to as a detection point) where a part of the object specified by the reflected waves is present. As the radio wave, a laser, a microwave, a millimeter wave, an ultrasonic wave, or the like can be appropriately used. The radar device 12 is attached to an optional place of the vehicle M. For example, as illustrated in FIG. 2, five radar devices 12 are provided, three of them are provided on the front side, and two of them are provided on the rear side. Output information of the radar devices 12 is transmitted to the control device 100.

The LIDAR 14 emits light (or an electromagnetic wave having a wavelength close to that of the light) to the around of the vehicle M and measures scattered light. The LIDAR 14 detects the presence or absence of the object and a distance to the object based on a time from the light emission to light reception. The emitted light is, for example, pulsed laser light. The LIDAR 14 is attached to an optional place of the vehicle M. For example, as illustrated in FIG. 2, five LIDAR 14 are provided, two of them are provided on the front side, and three of them are provided on the rear side. Output information of the LIDAR 14 is transmitted to the control device 100.

The communication device 20 communicates with another vehicle present in the around of the vehicle M by using, for example, a cellular network, a Wi-Fi (registered trademark) network, Bluetooth (registered trademark), and dedicated short range communication (DSRC), or communicates with various server devices via a wireless base station.

The HMI 30 presents various types of information to an occupant of the vehicle M and receives an input operation performed by the occupant. The HMI 30 includes various display devices, speakers, buzzers, touch panels, switches, keys, and the like.

The vehicle sensor 40 includes a vehicle speed sensor that detects a speed of the vehicle M, an acceleration sensor that detects acceleration, a yaw rate sensor that detects an angular velocity around a vertical axis, a direction sensor that detects a direction of the vehicle M, and the like.

The driver monitor camera 50 is, for example, a digital camera using an imaging element such as a CCD image sensor or a CMOS image sensor The driver monitor camera 50 is attached to an optional place of the vehicle M at a position and in a direction in which an image of a head of an occupant (hereinafter, referred to as a driver) seated in a driver seat of the vehicle M can be captured from a front (in a direction in which an image of a face is captured).

The navigation device 60 includes, for example, a global navigation satellite system receiver 61, a navigation HMI 62, and a route determination unit 63. The navigation device 60 stores first map information 64 in a storage device such as a hard disk drive (HDD) or a flash memory.

The GNSS receiver 61 specifies a position of the vehicle M based on a signal received from a GNSS satellite. The position of the vehicle M may be specified or complemented by an inertial navigation system (INS) using an output of the vehicle sensor 40.

The navigation HMI 62 includes display devices, speakers, touch panels, keys, and the like. The navigation HMI 62 may be partially or entirely shared with the HMI 30 described above.

For example, the route determination unit 63 determines, with reference to the first map information 64, a route (hereinafter, referred to as on-map route) from the position of the vehicle M specified by the GNSS receiver 61 (or an input optional position) to a destination input by the occupant by using the navigation HMI 62. The first map information 64 is, for example, information in which a road shape is represented by a link indicating a road and nodes connected by the link. The first map information 64 may include a curvature of a road, point of interest (POI) information, and the like. The on-map route is output to the MPU 70.

The navigation device 60 may perform, based on the on-map route, route guidance using the navigation I-IMI 62. The navigation device 60 may transmit a current position and the destination to a navigation server via the communication device 20 and acquire a route equivalent to the on-map route from the navigation server.

The MPU 70 includes, for example, a recommended lane determination unit 71, and stores second map information 72 in a storage device such as an HDD or a flash memory. The recommended lane determination unit 71 divides the on-map route provided by the navigation device 60 into a plurality of blocks (for example, divides the on-map route every 100 [m] in the traveling direction of the vehicle), and determines a recommended lane for each block with reference to the second map information 72. For example, the recommended lane determination unit 71 determines which lane from a left the vehicle travels in. When there is a branching place on the on-map route, the recommended lane determination unit 71 determines the recommended lane such that the vehicle M can travel on a reasonable route for traveling to a branch destination.

The second map information 72 is map information having accuracy higher than that of the first map information 64. The second map information 72 includes information on a center of a lane, information on boundaries of the lane, and the like. The second map information 72 may further include road information, traffic regulation information, address information, facility information, telephone number information, and the like. The second map information 72 may be updated as needed by the communication device 20 communicating with another device.

The driving operator 80 includes, for example, an accelerator pedal, a brake pedal, a shift lever, a blinker, and other operators in addition to a steering wheel 82. A sensor that detects an operation amount or presence or absence of an operation is attached to the driving operator 80, and a detection result thereof is output to the control device 100 or a part or all of the travel driving force output device 200, the brake device 210, and the steering device 220.

The steering wheel 82 does not necessarily have to be annular, and may be in a form of an irregularly shaped steering member, a joystick, a button, or the like. A steering grip sensor 84 is attached to the steering wheel 82. The steering grip sensor 84 is implemented by an electrostatic capacitance sensor or the like, and outputs a signal capable of detecting whether the driver grips the steering wheel 82 to the control device 100.

The control device 100 includes at least a processor such as a central processing unit (CPU) and a storage medium necessary for an operation of the processor. The processor functions as a first control unit 120 and a second control unit 160 by executing a program stored in the storage medium. The control device 100 is not limited to one that performs processing by a single processor, and may be one that performs processing by a plurality of processors in a shared manner.

<Configurations of First Control Unit 120 and Second Control Unit 160>

Figure 3:
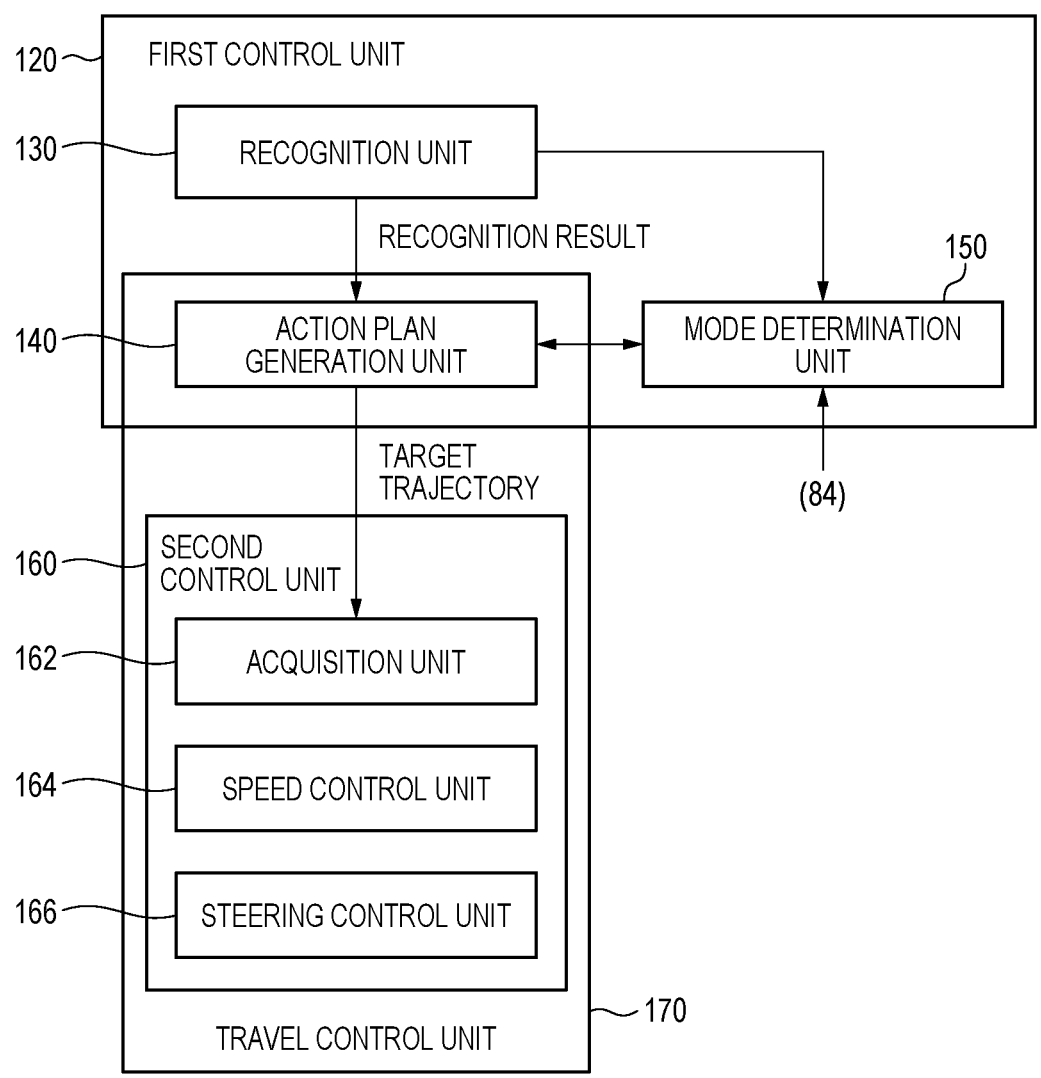
FIG. 3 is a diagram illustrating an example of configurations of a first control unit 120 and a second control unit 160.

FIG. 3 is a diagram illustrating an example of configurations of the first control unit 120 and the second control unit 160. The first control unit 120 includes, for example, a recognition unit 130, an action plan generation unit 140, and a mode determination unit 150. The first control unit 120 implements, for example, a function by artificial intelligence (AI) and a function by a model given in advance in parallel.

For example, a function of "recognizing an intersection" may be implemented by executing recognition of the intersection based on deep learning or the like and recognition based on a condition (including a signal, a road sign, or the like that can be subjected to pattern matching) given in advance in parallel, scoring both of them, and comprehensively evaluating them. Accordingly, reliability of automatic driving is ensured.

For example, the recognition unit 130 recognizes a travel environment in which the vehicle M is traveling. For example, the recognition unit 130 recognizes a travel lane of the vehicle M by comparing a pattern of a road partition line (for example, an arrangement of solid lines and broken lines) obtained from the second map information 72 with a pattern of a road partition line in the around of the vehicle M recognized from an image captured by the camera 10. The recognition unit 130 may recognize the travel lane by recognizing traveling boundaries (road boundaries) including the road partition lines, road shoulders, curbstones, a median strip, guardrails, or the like, without being limited to the road partition lines. In the recognition, the position of the vehicle M acquired from the navigation device 60 or a processing result obtained by the INS may be added. Further, the recognition unit 130 recognizes a temporary stop line, an obstacle, a red light, a toll gate, and other road events.

When recognizing the travel lane, the recognition unit 130 recognizes the position and a posture of the vehicle M with respect to the travel lane. For example, the recognition unit 130 may recognize a deviation of a reference point of the vehicle M from a center of the lane and an angle formed between a traveling direction of the vehicle M and a line connecting a center of the lane as a relative position and a posture of the vehicle M with respect to the travel lane. Alternatively, the recognition unit 130 may recognize a position of the reference point of the vehicle M with respect to any side end portion (a road partition line or a road boundary) of the travel lane as the relative position of the vehicle M with respect to the travel lane.

The recognition unit 130 recognizes a peripheral environment of the vehicle M based on output information of a part or all of the cameras 10, the radar devices 12, and the LIDAR 14. For example, the recognition unit 130 recognizes a position of an object in the around of the vehicle M, a type of the object (whether the object is a moving object or a stationary object), and the like. The position of the object is recognized as, for example, a position on absolute coordinates (an XY plane indicated by a Y axis (a Y axis Ay in FIG. 6) that passes through a representative point (a center of gravity, a center of a driving axis, or the like) of the vehicle M and is parallel to a left-right direction and an X axis (an X axis Ax in FIG. 6) that passes through the representative point of the vehicle M and is parallel to the front-rear direction) having the representative point of the vehicle M as an origin, and is used for various types of control.

Examples of the object in the around of the vehicle M include a moving object (another vehicle traveling around the vehicle M and a stationary object (an object forming a boundary of a road such as a planting, a wall, or a median strip, or an installation object (a cone, a guardrail, a signboard, a temporary traffic light, or the like)) specific to construction work or an accident. The installation object includes a specific object (specifically, a pylon) that can be discretely arranged on the road.

The recognition unit 130 performs processing of recognizing that the peripheral environment of the vehicle M is a travel-restricted section based on the output information of a part or all of the cameras 10, the radar devices 12, and the LIDAR 14. The phrase "the peripheral environment of the vehicle M is a travel-restricted section" refers to either a situation in which the vehicle M is traveling in the travel-restricted section or a situation in which the travel-restricted section is present ahead of the vehicle M by a predetermined distance. A phrase "the peripheral environment of the vehicle M is not a travel-restricted section" refers to a situation in which the vehicle M is not traveling in the travel-restricted section and the travel-restricted section is not present ahead of the vehicle M. The recognition unit 130 performs processing of collecting, as detection point group data, a set of detection point data having substantially the same distance from the vehicle M based on the output information of the radar devices 12, and acquiring the detection point group data. The recognition unit 130 recognizes that the peripheral environment of the vehicle M is the travel-restricted section based on a distribution of the detection point group data. The recognition will be described later.

The action plan generation unit 140 generates a target trajectory along which the vehicle M travels in the future automatically (not depending on an operation of the driver) such that the vehicle M travels in a recommended lane determined by the recommended lane determination unit 71 in principle and the recommended lane can cope with a surrounding situation of the vehicle M. The target trajectory includes, for example, a speed element. For example, the target trajectory is represented by sequentially arranging points (trajectory points) to be reached by the vehicle M. The trajectory point is a point to be reached by the vehicle M for each predetermined travel distance (for example, about several[m]) at a road distance, and separately, a target speed and a target acceleration for each predetermined sampling time (for example, about 0.X [sec]) are generated as a part of the target trajectory. The trajectory point may be a position to be reached by the vehicle M at a sampling time point for each predetermined sampling time. In this case, information on the target speed and the target acceleration is represented by an interval between the trajectory points.

When generating the target trajectory, the action plan generation unit 140 may set an event of the automatic driving. Examples of the event of the automatic driving include a constant speed traveling event, a low speed following traveling event, a lane change event, a branching event, a merging event, and a takeover event. The action plan generation unit 140 generates the target trajectory in accordance with an activated event.

The mode determination unit 150 determines a driving mode of the vehicle M be any one of a plurality of driving modes having different tasks imposed on the driver. Further, when a task of the determined driving mode (hereinafter, referred to as current driving mode) is not executed h the driver, the mode determination unit 150 changes the driving mode of the vehicle M to a driving mode having a heavier task. The mode determination unit 150 is an example of a control state setting unit that selects an automation mode of control of at least one of the travel speed and steering of the vehicle M from the plurality of driving modes and set the automation mode.

<Specific Example of Driving Mode>

FIG. 4 is a diagram illustrating a specific example of the driving mode. The driving mode of the vehicle M includes, for example, five modes from a first driving mode to a fifth driving mode. A control state, that is, a degree of automation of driving control of the vehicle M is the highest in the first driving mode, then decreases in an order of the second driving mode, the third driving mode, and the fourth driving mode, and is the lowest in the fifth driving mode. On the contrary, a task imposed on the driver is the lightest in the first driving mode, then becomes heavy in the order of the second driving mode, the third driving mode, and the fourth driving mode, and is the heaviest in the fifth driving mode. Since the driving mode is in the control state which is not the automatic driving in the driving modes other than the first driving mode, the control device 100 is in charge of ending control of the automatic driving and shifting to driving assistance or manual driving. Hereinafter, contents of the respective driving modes will be exemplified.

In the first driving mode, an automatic driving state is established, and neither front monitoring nor gripping of the steering wheel 82 is imposed on the driver. However, even in the first driving mode, the driver is required to be in a posture capable of shifting to the manual driving in response to a request from the control device 100. Here, the term "automatic driving" means that both steering and acceleration and deceleration are controlled without depending on an operation of the driver. The front means a space in the traveling direction of the vehicle M visually recognized via a front windshield. The first driving mode is, for example, a driving mode that can be executed when a condition is satisfied that the vehicle M is traveling at a predetermined speed or less (for example, about 60[km/h]) on an automobile dedicated road such as an expressway and a preceding vehicle to be followed is present.

In the second driving mode, a driving assistance state is established, and a task of monitoring a front of the vehicle M (hereinafter, referred to as front monitoring) is imposed on the driver, but a task of gripping the steering wheel 82 is not imposed on the driver. In the third driving mode, the driving assistance state is established, and the task of front monitoring and the task of gripping the steering wheel 82 are imposed on the driver. The fourth driving mode is a driving mode in which a certain degree of driving operation by the driver is necessary for at least one of the steering and the acceleration and deceleration of the vehicle M. For example, in the fourth driving mode, driving assistance such as adaptive cruise control (ACC) and lane keeping assist system (LKAS) is performed. The fifth driving mode is a manual driving state in which the driving operation by the driver is required for both steering and acceleration and deceleration. In both the fourth driving mode and the fifth driving mode, the task of monitoring the front of the vehicle M is naturally imposed on the driver.

Returning to FIGS. 3, the second control unit 160 performs control such that the vehicle M passes through the target trajectory generated by the action plan generation unit 140 at a scheduled time point. The second control unit 160 includes, for example, an acquisition unit 162, a speed control unit 164, and a steering control unit 166.

The acquisition unit 162 acquires information on the target trajectory (trajectory points) generated by the action plan generation unit 140, and stores the acquired information in a memory (not illustrated). The speed control unit 164 controls the travel driving force output device 200 (see FIG. 1) or the brake device 210 (see FIG. 1) based on the speed element accompanying the target trajectory stored in the memory. The steering control unit 166 controls the steering device 220 (see FIG. 1) in accordance with a degree of curvature of the target trajectory stored in the memory. The processing of the speed control unit 164 and the steering control unit 166 is implemented by, for example, a combination of feed-forward control and feedback control.

In the control device 100, a combination of the action plan generation unit 140 and the second control unit 160 constitutes a travel control unit 170. The travel control unit 170 executes control of the auto lane change in the vehicle M based on a recognition result of the travel environment, the peripheral environment, or the like of the vehicle M recognized by the recognition unit 130. In addition, the travel control unit 170 detects an intention of the driver to change the lane based on an operation of the driving operator 80 (for example, a turn signal lever) performed by the driver.

The travel control unit 170 selects one lane change mode from a plurality of lane change modes having different degrees of involvement by the driver of the vehicle M, and performs travel control (also referred to as lane change control) according to the selected lane change mode. The plurality of lane change modes having different degrees of involvement by the driver of the vehicle M can be referred to as a plurality of lane change modes having different degrees of automation. The smaller the degree of involvement by the driver is, the higher the degree of automation is, and the larger the degree of involvement by the driver is, the lower the degree of automation is.

For example, the plurality of lane change modes may include the following three modes of the auto lane change. The first auto lane change is an intended auto lane change (ALC-category C) in which the driver of the vehicle M himself/herself intends to change the lane and the driver of the vehicle M instructs a start of the lane change. In the intended auto lane change, the driver of the vehicle M determines whether to change the lane in consideration of a travel state of another vehicle, a route to a destination, and the like. When the driver of the vehicle M determines to change the lane, the driver instructs the start of the lane change to the vehicle M by operating the driving operator 80. Based on the instruction, the travel control unit 170 starts the auto lane change at an executable timing in consideration of a surrounding travel state.

The second auto lane change is a proposed auto lane change (ALC-category D) in which the travel control unit 170 proposes the lane change and the driver of the vehicle M approves the lane change. In the proposed auto lane change, the travel control unit 170 determines whether to change the lane based on a travel state of another vehicle, the route to the destination, and the like. When determining to change the lane, the travel control unit 170 proposes the lane change to the driver. When approving the proposal of the lane change, the driver of the vehicle M gives an instruction to start the lane change to the vehicle M by operating an approval switch. The approval switch may be a switch dedicated to approval, or may be an operator for example, the driving operator 80) that also serves as another function.

Based on the instruction, the travel control unit 170 starts the auto lane change at an executable timing in consideration of the surrounding travel state. Therefore, when the driver does not approve the proposal of the lane change, that is, when the driver does not operate the driving operator 80, the auto lane change is not executed.

The third auto lane change is a determined auto lane change (ALC-category E) in which the travel control unit 170 determines the lane change and the travel control unit 170 determines to start the lane change. In the determined auto lane change, the travel control unit 170 determines whether to change the lane based on the travel state of another vehicle, the route to the destination, and the like. When the travel control unit 170 determines to change the lane, the travel control unit 170 starts the auto lane change at an executable timing in consideration of the surrounding travel state. In the case of the determined auto lane change, the driver of the vehicle M is not involved in the lane change.

The control device 100 executes the auto lane change according to the driving mode. For example, the control device 100 may execute the determined auto lane change in the first driving mode. The control device 100 may execute the proposed auto lane change in the second driving mode, the third driving mode, and the fourth driving mode. The control device 100 may execute the intended auto lane change in the third driving mode and the fourth driving mode. The control device 100 does not execute any auto lane change in the fifth driving mode.

Returning to FIG. 1, the travel driving force output device 200 outputs a travel driving force (torque) for the vehicle to travel to driving wheels. The travel driving force output device 200 includes, for example, a combination of an internal combustion engine, an electric motor, a transmission, and the like, and an electronic control unit (ECU) that controls these components. The ECU controls the above-described configuration components according to information received from the second control unit 160 or information received from the driving operator 80.

The brake device 210 includes, for example, a brake caliper, a cylinder that transfers hydraulic pressure to the brake caliper, an electric motor that generates the hydraulic pressure in the cylinder, and a brake ECU. The brake ECU controls the electric motor according to the information received from the second control unit 160 or the information received from the driving operator 80 such that a brake torque according to a braking operation is output to each wheel.

The steering device 220 includes, for example, a steering ECU and an electric motor. For example, the electric motor changes a direction of steering wheels by applying a force to a rack and pinion mechanism. The steering ECU drives the electric motor and changes the direction of the steering wheels according to the information received from the second control unit 160 or the information received from the driving operator 80.

<Detectable Range of Object>

Figure 5:
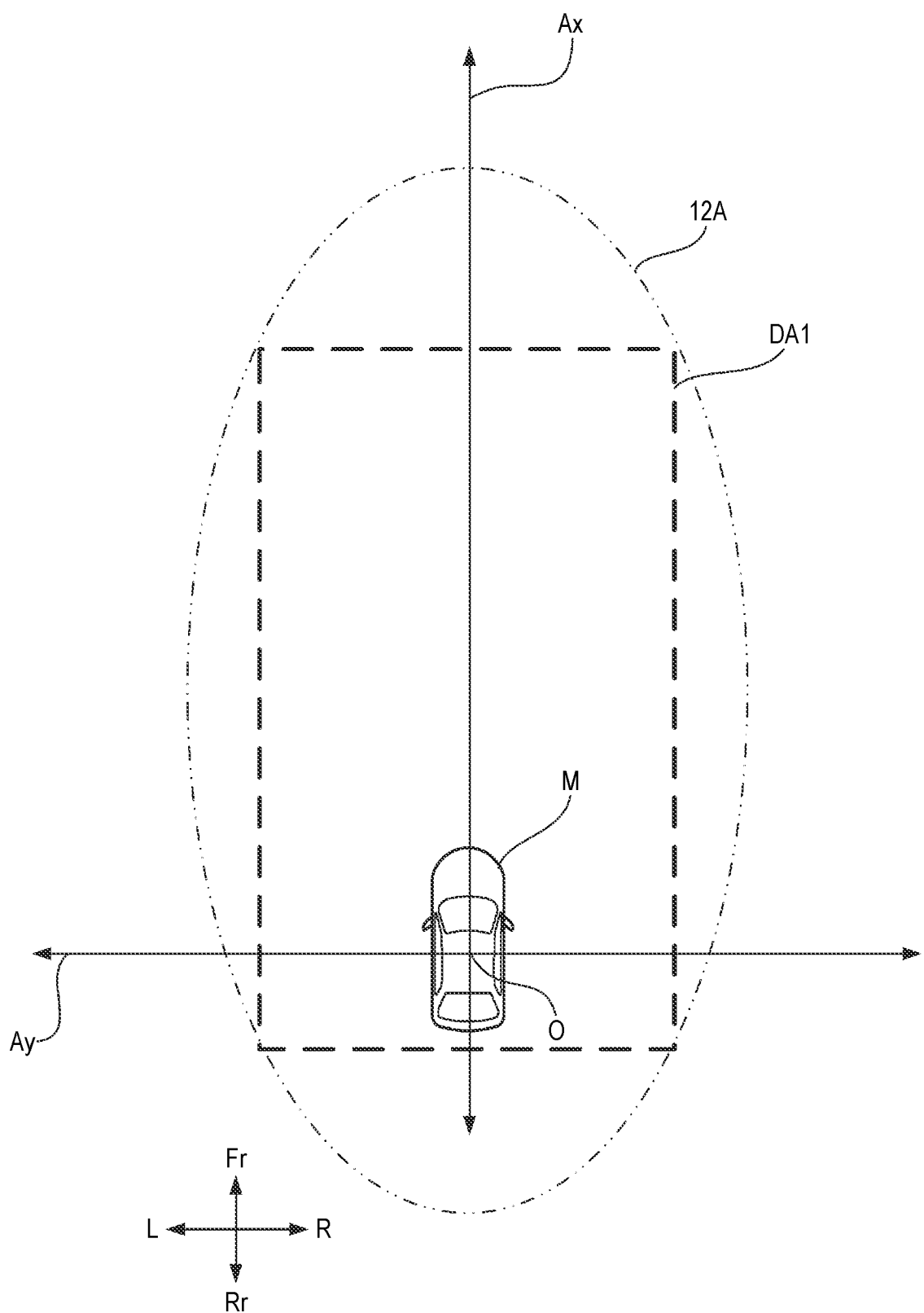
FIG. 5 is a view schematically illustrating a region in which an object can be detected by radar devices 12 in the around of the vehicle M.

FIG. 5 is a view schematically illustrating a region in which the object can be detected by the radar devices 12 in the around of the vehicle M. FIG. 5 illustrates a range 12A in which the object can be detected by the radar devices 12. In the present embodiment, for example, a peripheral region DA1 that is included in the range 12A and in which a detection resolution of the object detected by the radar devices 12 is sufficiently high is set. The recognition unit 130 acquires the detection point group data in the peripheral region DA1. That is, when an object is present in the peripheral region DA1, detection point data of the object is output from the radar devices 12, and detection point group data corresponding to the object is acquired by the recognition unit 130 from the detection point data. A position of the detection point group data is managed as coordinates on the XY plane indicated by the X axis Ax and the Y axis Ay illustrated in FIG. 5. An origin O illustrated in FIG. 5 indicates the representative point of the vehicle M.

Hereinafter, a group including all detection point group data existing in a region (a region on a left side of the X axis Ax) on a left side of the vehicle M in the peripheral region DA1 is referred to as a first group, and a group including all detection point group data existing in a region (a region on a right side of the X axis Ax) on a right side of the vehicle M in the peripheral region DA1 is referred to as a second group.

<Recognition Processing of Travel-Restricted Section>

Figure 6:
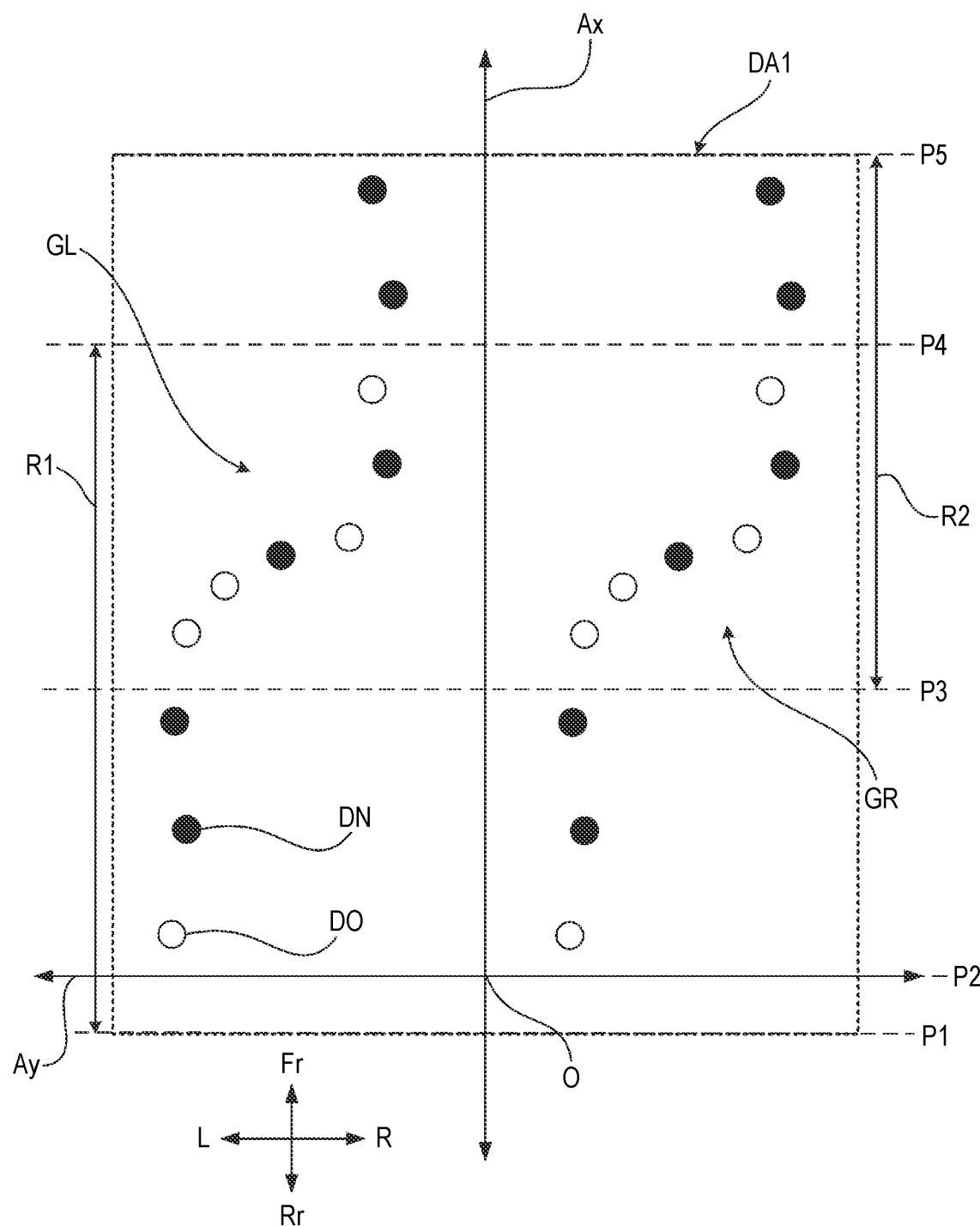
FIG. 6 is a schematic diagram illustrating an example of acquisition of detection point group data in a peripheral region DA1.

FIG. 6 is a schematic diagram illustrating an example of the detection point group data acquired by the recognition unit 130. As illustrated in FIG. 6, a position P1 on a rear end, a position P2 where the vehicle M is present, a position P5 on a front end, a position P3 between the position P2 and the position P5 and a position P4 between the position P3 and the position P5 are set in the peripheral region DAT as positions in the front-rear direction.

The recognition unit 130 periodically acquires the detection point group data in synchronization with an output cycle of the radar devices 12. In the detection point group data illustrated in FIG. 6, latest detection point group data DN acquired by the recognition unit 130 and detection point group data DO acquired in a cycle immediately before the detection point group data DN are illustrated. The recognition unit 130 recognizes the travel-restricted section by using the detection point group data for the two cycles. The recognition unit 130 may recognize the travel-restricted section by using the detection point group data for three or more cycles.

FIG. 6 illustrates a first group GL including six pieces of detection point group data DN and five pieces of detection point group data DO present in a region on the left side of the peripheral region DAT, and a second group GR including six pieces of detection point group data DN and five pieces of detection point group data. DO present in a region on the right side of the peripheral region DA1.

When the recognition unit 130 acquires the detection point group data as illustrated in FIG. 6, the recognition unit 130 classifies the first group GL into a plurality of first subgroups and classifies the second group into a plurality of second subgroups.

The first subgroup refers to a group including N (N is a natural number of 2 or more) or more pieces of detection point group data whose positions in the left-right direction are close to each other among the detection point group data of the first group GL present in a first range R1 in the front-rear direction of the peripheral region DAT, and a group including N or more pieces of detection point group data whose positions in the left-right direction are close to each other among the detection point group data of the first group GL present in a second range R2 in the front-rear direction of the peripheral region DAL In the example of FIG. 6, a range between the position P1 and the position P4 is se as a first range R1, and a range between the position P3 and the position P5 is set as the second range R2.

The second subgroup refers to a group including N or more pieces of detection point group data whose positions in the left-right direction are close to each other among the detection point group data of the second group GR present in the first range R1 of the peripheral region DA1, and a group including N or more pieces of detection point group data whose positions in the left-right direction are close to each other among the detection point group data of the second group GR present in the second range R2 of the peripheral region DA1.

(Specific Example of Processing of Classifying First Group into First Subgroup)

The recognition unit 130 sets a rectangular search range SU having a width in the front-rear direction coinciding with a width of the first range R1 in the front-rear direction and a width in the left-right direction being a predetermined distance D1 (a value smaller than a half value of a width of the peripheral region DA1 in the left-right direction) in a left portion of the first range R1, and searches the search range SL1 fix the first subgroup while moving the search range SL1 by a predetermined unit distance in the left-right direction in the left portion of the first range R1.

When N or more pieces of detection point group data are included in the search range SL1, the recognition unit 130 ends the movement of the search range SL1, and sets the detection point group data present in the search range SL1 at that time as a first subgroup GL1. When N is 5, five pieces of detection point group data in the search range SL1 are classified as the first subgroup GL1 in a state where the search range SL1 is located at a position illustrated in FIG. 7.

The recognition unit 130 sets a rectangular search range SL2 having a width in the front-rear direction coinciding with a width of the second range R2 in the front-rear direction and a width in the left-right direction being the distance D1 in a left portion of the second range R2, and searches the search range SL2 for the second subgroup while moving the search range SL2 by a unit distance in the left-right direction in the left portion of the second range R2. When N or more pieces of detection point group data are included in the search range SL2, the recognition unit 130 ends the movement of the search range SL2, and sets the detection point group data present in the search range SL2 at that time as a first subgroup GL2. When N is 5, five pieces of detection point group data in the search range SL2 are classified as the first subgroup GL2 in a state where the search range SL2 is located at a position illustrated in FIG. 7.

(Specific Example of Processing of Classifying Second Group into Second Subgroup)

The recognition unit 130 sets a rectangular search range SR1 having a width in the front-rear direction coinciding with the width of the first range R1 in the front-rear direction and a width in the left-right direction being the distance D1 in a right portion of the first range R1, and searches the search range SR1 for the second subgroup while moving the search range SL1 by a unit distance in the left-right direction in the right portion of the first range R1. When N or more pieces of detection point group data are included in the search range SR1, the recognition unit 130 ends the movement of the search range SR1, and sets the detection point group data present in the search range SR1 at that time as a second subgroup GR1. When N is 5, five pieces of detection point group data in the search range SR1 are classified as the second subgroup GR1 in a state where the search range SR1 is located at a position illustrated in FIG. 7.

The recognition unit 130 sets a rectangular search range SR2 having a width in the front-rear direction coinciding with the width of the second range R2 in the front-rear direction and a width in the left-right direction being the distance D1 in a right portion of the second range R2, and searches the search range SR2 for the second subgroup while moving the search range SR2 by a unit distance in the left-right direction in the right portion of the second range R2. When N or more pieces of detection point group data are included in the search range SR2, the recognition unit 130 ends the movement of the search range SR2, and sets the detection point group data present in the search range SR2 at that time as a second subgroup GR2. When N is 5, five pieces of detection point group data in the search range SR2 are classified as the second subgroup GR2 in a state where the search range SR2 is located at a position illustrated in FIG. 7.

Figure 7:
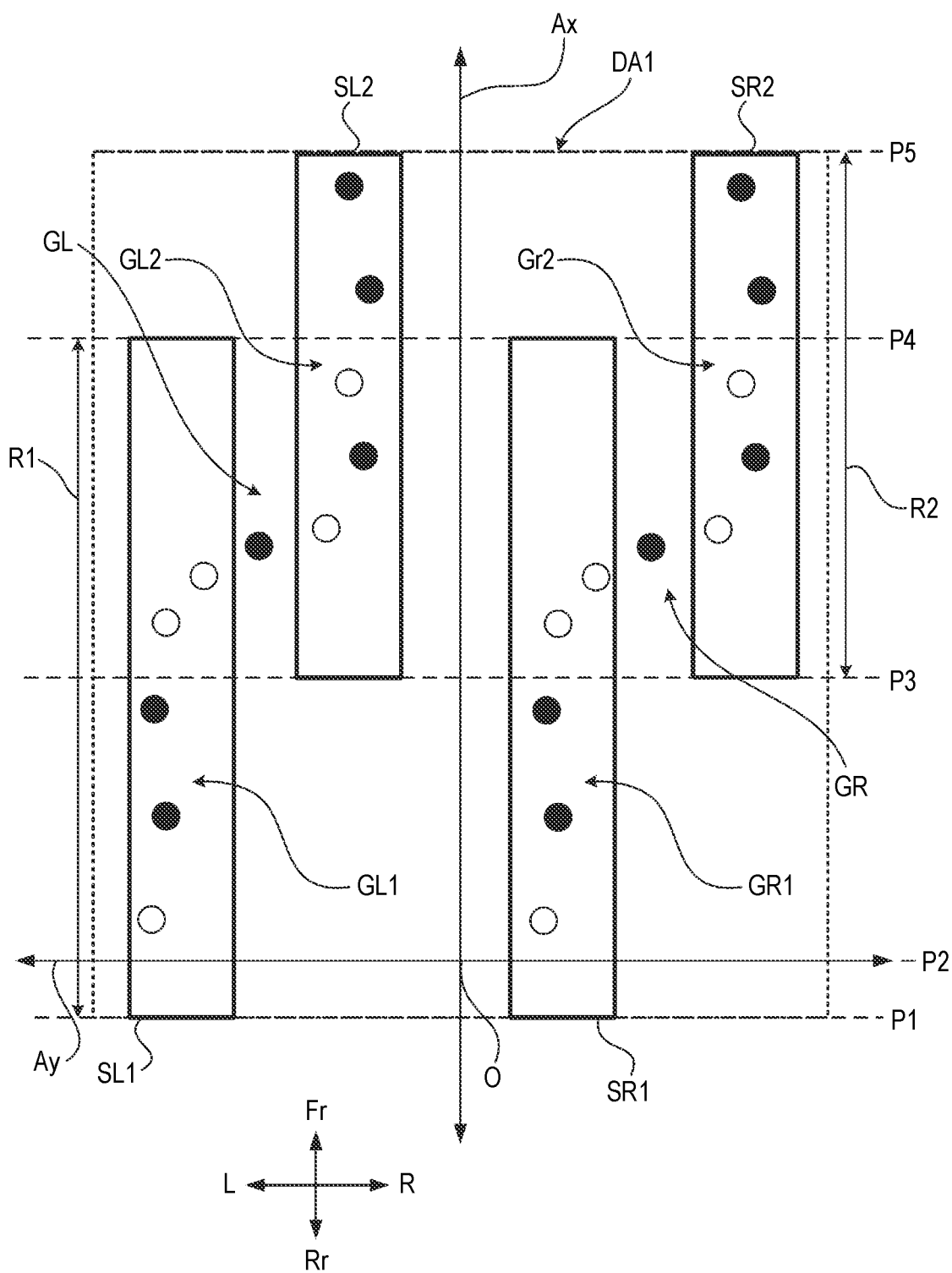
FIG. 7 is a schematic diagram illustrating an operation of classifying a first group and a second group into subgroups.

The recognition unit 130 treats positions in the front-rear direction (for example, center positions in the front-rear direction) of the search range SL1, the search range SL2, the search range SR1, and the search range SR2 at the end of the movement illustrated in FIG. 7 as positions in the front-rear direction of the subgroups including the detection point group data included in the search range SU, the search range SL2, the search range SR1 and the search range SR2.

Further, the recognition unit 130 treats positions in the left-right direction (for example, the center positions in the left-right direction) of the search range SL1, the search range SL2, the search range SR1, and the search range SR2 illustrated in FIG. 7 as positions in the left-right direction of the subgroups including the detection point group data included in the search range SL1, the search range SL2, the search range SR1, and the search range SR2.

For example, the position of the search range SL1 in the left-right direction illustrated in FIG. 7 is treated as the position of the first subgroup GL1 in the left-right direction, and the position of the search range SL1 in the front-rear direction is treated as the position of the first subgroup GL1 in the front-rear direction.

The recognition unit 130 recognizes that the peripheral environment of the vehicle M is the travel-restricted section based on a variation amount (hereinafter, referred to as a first variation amount) in the positions of the first subgroup GL1 and the first subgroup GL2 in the left-right direction obtained by being classified from the first group GL and a variation amount (hereinafter, referred to as a second variation amount) in the positions of the second subgroup GR1 and the second subgroup GR2 in the left-right direction obtained by being classified from the second group GR.

Specifically, the recognition unit 130 acquires a distance between the position of the first subgroup GL1 in the left-right direction and the position of the first subgroup GL2 in the left-right direction as the first variation amount. The recognition unit 130 acquires a distance between the position of the second subgroup GR1 in the left-right direction and the position of the second subgroup GR2 in the left-right direction as the second variation amount. When one or both of the first variation amount and the second variation amount are equal to or greater than a threshold, the recognition unit 130 recognizes that the peripheral environment of the vehicle M is the travel-restricted section. When both the first variation amount and the second variation amount are less than the threshold, the recognition unit 130 recognizes that the peripheral environment of the vehicle M is not the travel-restricted section.

Figure 8:
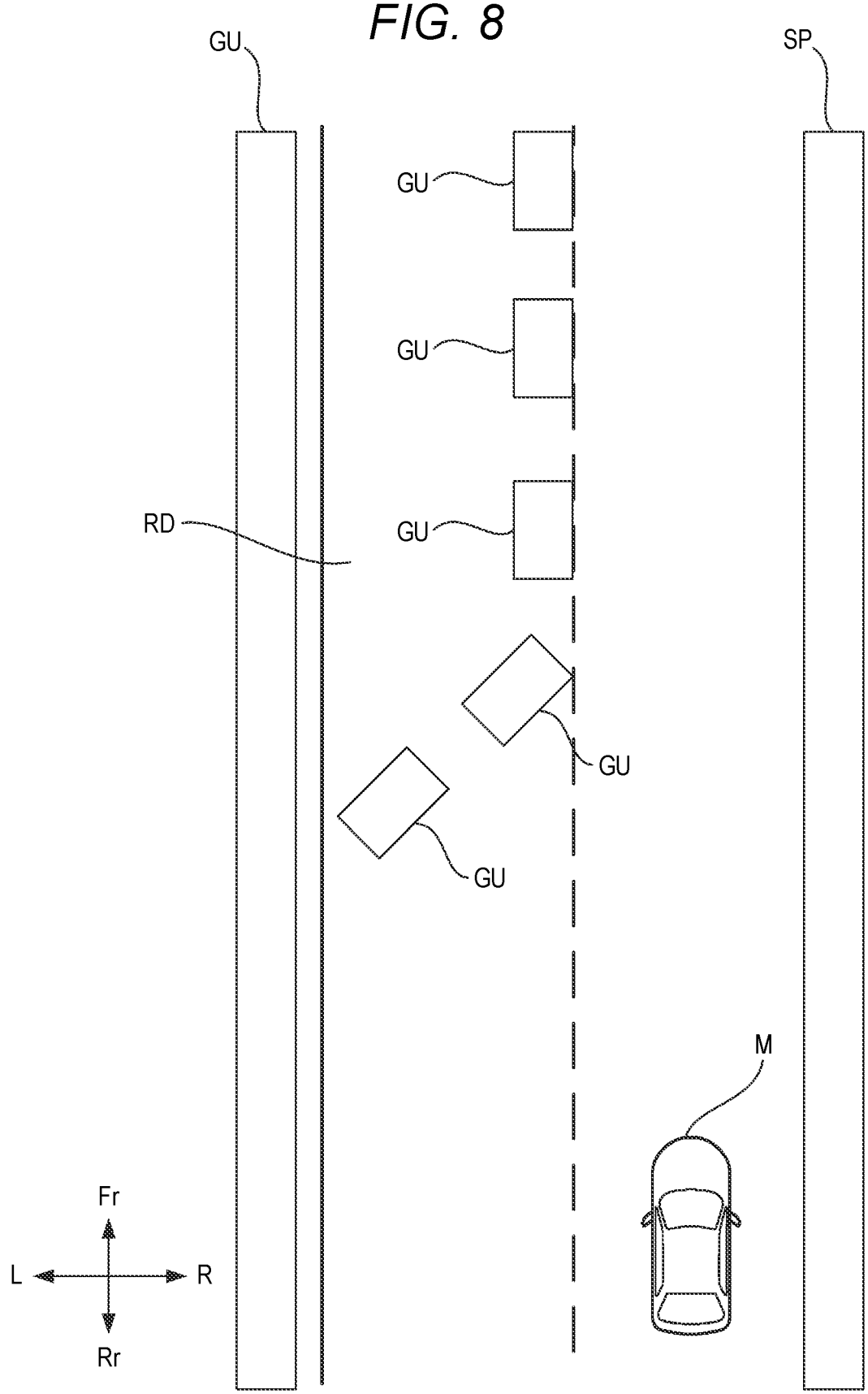
FIG. 8 is a schematic view illustrating an example of a peripheral environment of the vehicle M.

FIG. 8 is a schematic view illustrating an example of the peripheral environment of the vehicle M. FIG. 8 illustrates a situation in which the vehicle M is traveling in an overtaking lane of a road RD having two lanes on each side, and in front of the vehicle M, a travel lane of the two lanes is not allowed to travel due to construction work or the like. In FIG. 8, objects GU such as a wall or a guardrail is present at a left end of the road RD, and an object SP indicating a median strip is present at a right end of the road RD. In FIG. 8, the objects GU such as a guardrail or a cone are disposed in front of the vehicle M in order to restrict the two lanes to one lane. In the situation illustrated in FIG. 8, the first variation amount of the first variation amount and the second variation amount is equal to or greater than the threshold, and the second variation amount is less than the threshold. Therefore, in the situation illustrated in FIG. 8, it is possible to recognize that the peripheral environment of the vehicle M is the travel-restricted section.

Figure 9:
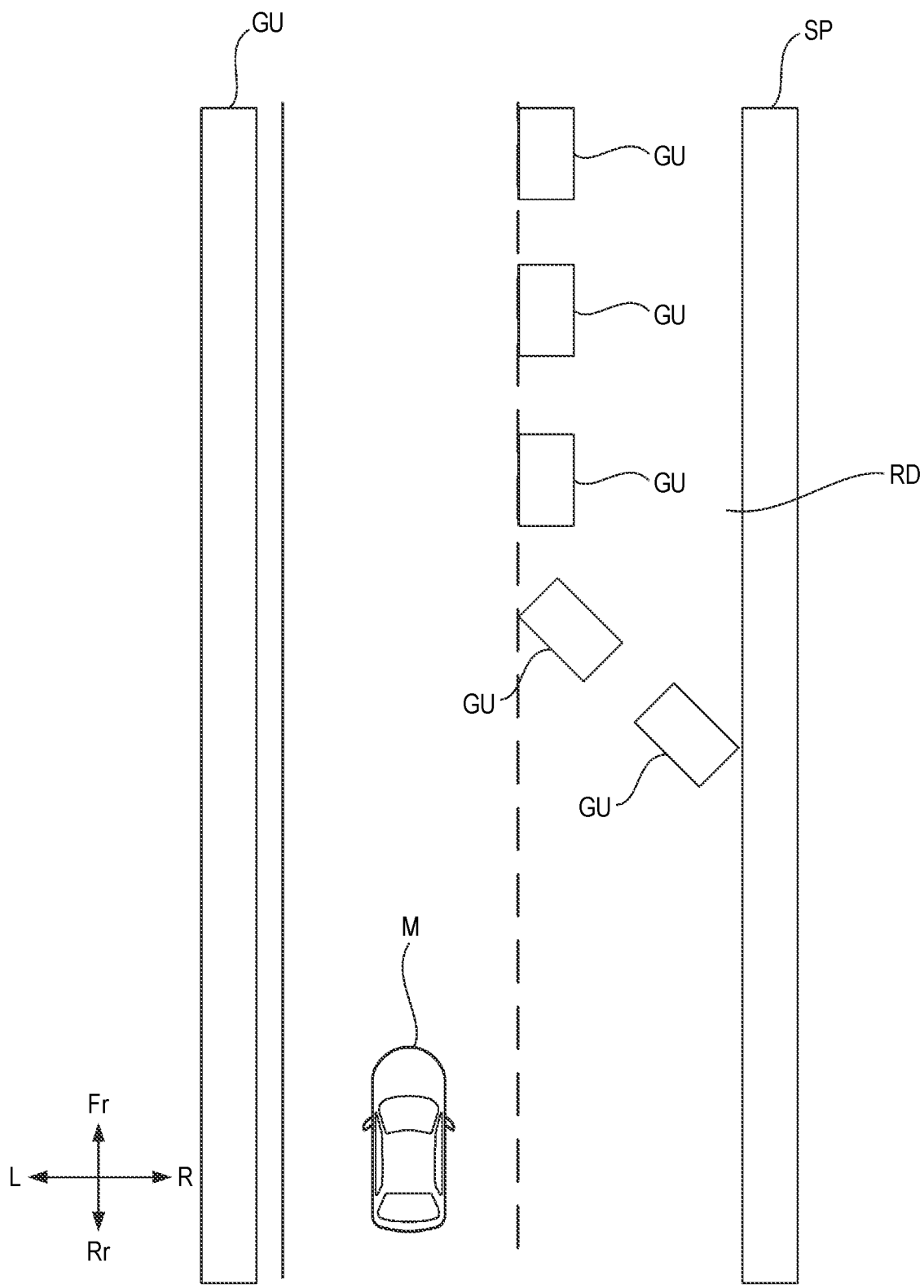
FIG. 9 is a schematic view illustrating an example of the peripheral environment of the vehicle M.

FIG. 9 is a schematic view illustrating an example of the peripheral environment of the vehicle M. FIG. 9 illustrates a situation in which the vehicle M is traveling in the travel lane of the road RD having two lanes on each side, and in front of the vehicle M, the overtaking lane of the two lanes is not allowed to travel due to construction work or the like. Lu FIG. 9, the object GU such as a wall or a guardrail is present at the left end of the road RD, and the object SP indicating the median strip is present at the right end of the road RD. In FIG. 9, the objects GU such as a guardrail or a cone are disposed in front of the vehicle M in order to restrict the two lanes to one lane. In the situation illustrated in FIG. 9, the first variation amount of the first variation amount and the second variation amount is less than the threshold, and the second variation amount is equal to or greater than the threshold. Therefore, in the situation illustrated in FIG. 9, it is possible to recognize that the peripheral environment of the vehicle M is the travel-restricted section.

Figure 10:
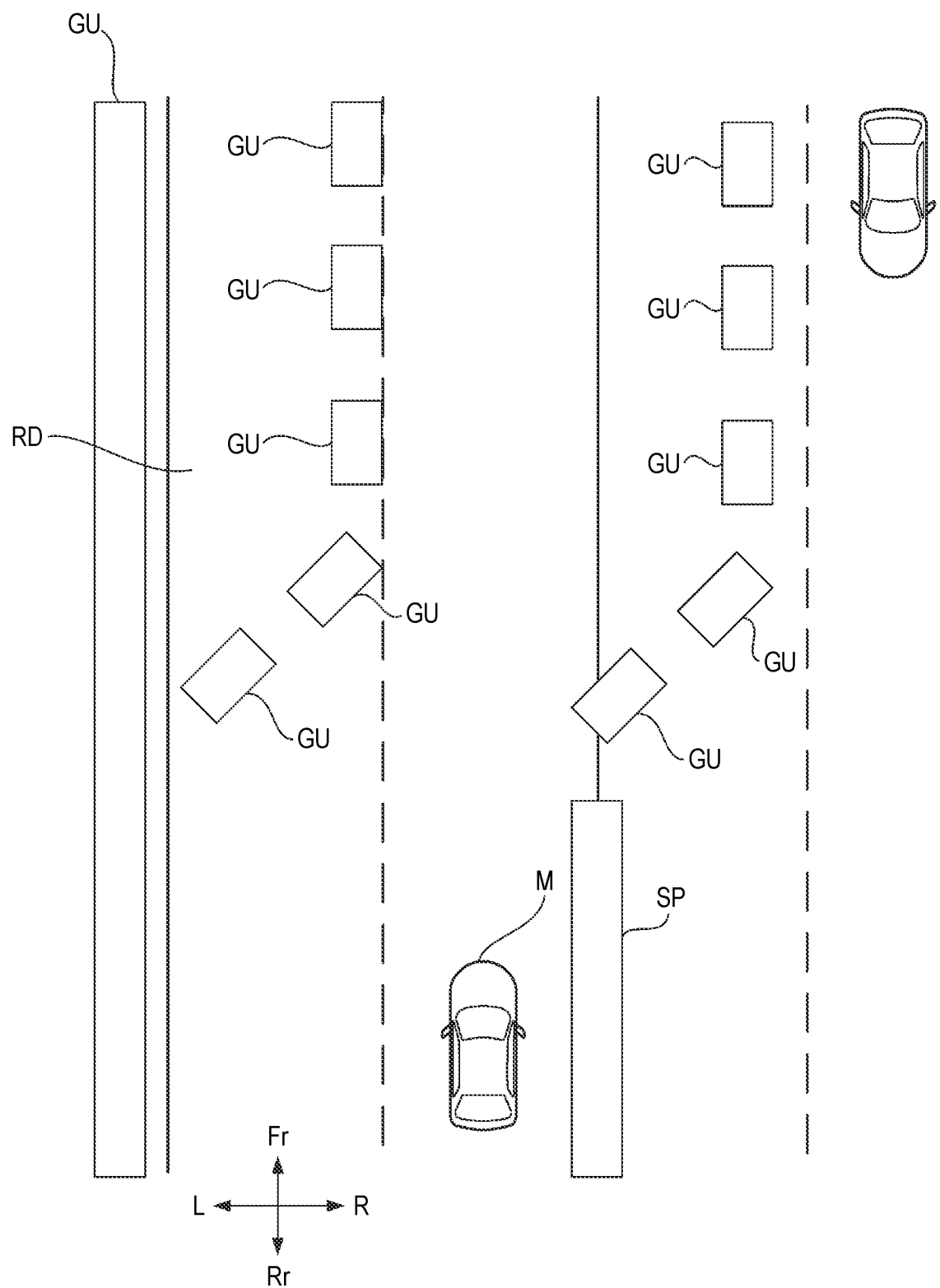
FIG. 10 is a schematic view illustrating an example of the peripheral environment of the vehicle M.

FIG. 10 is a schematic view illustrating an example of the peripheral environment of the vehicle M. FIG. 10 illustrates a situation in which the vehicle M is traveling in the overtaking lane of the road RD having two lanes on each side, and in front of the vehicle M, the travel lane of the two lanes and an overtaking lane of an opposite lane are not allowed to travel due to construction work or the like. In FIG. 10 the objects GU such as a wall or a guardrail is present on the left end of the road RD, and the object SP indicating the median strip is present on a right side of the vehicle M. In FIG. 10, the objects GU such as a guardrail or a cone is disposed in front of the vehicle M in order to restrict three lanes to one lane. In the situation illustrated in FIG. 10, each of the first variation amount and the second variation amount is equal to or greater than the threshold. Therefore, in the situation illustrated in FIG. 10, it is possible to recognize that the peripheral environment of the vehicle M is the travel-restricted section.

In this way, by recognizing that the peripheral environment of the vehicle M is the travel-restricted section based on the distribution of the detection point group data, the recognition of the travel-restricted section can be performed with high accuracy before recognizing the object (specifying a type of the object) based on the detection point group data. Since the recognition of the travel-restricted section can be performed without recognizing the object, the recognition of the travel-restricted section can be performed with high accuracy without being affected by recognition accuracy when the object is recognized based on the detection point group data.

In the control device 100, when the recognition unit 130 recognizes that the travel environment is the travel-restricted section, the travel control unit 170 preferably restricts the travel control of the vehicle M. Specifically, the travel control unit 170 restricts the lane change control. The restriction of the lane change control refers to prohibiting the lane change control or prohibiting a part of the lane change mode although the lane change control is executed. In this way, in a situation in which the vehicle M is traveling in the travel-restricted section or in a situation in which the vehicle M is approaching the travel-restricted section, it is possible to cause the vehicle M to travel safely by restricting the lane change control.

The recognition unit 130 recognizes that the peripheral environment of the vehicle M is the travel-restricted section based on the distribution of the detection point group data acquired for each object. However, it is also possible to recognize that the peripheral environment of the vehicle M is the travel-restricted section by using distributions of all the detection point data included in the first group GL or distributions of all the detection point data included in the second group GR.

In the present specification, at least the following matters are described. Although corresponding components or the like in the above embodiment are shown in parentheses, the present disclosure is not limited thereto.

(1) A control device (control device 100) that performs travel control of a vehicle (vehicle M), the control device includes: a processor configured to acquire output information of a sensor (radar devices 12) configured to detect an object in the around of the vehicle based on a reflected wave from the object.

The processor is configured to acquire detection point data (detection point group data DN and DO) of the object in a peripheral region (peripheral region DA1) of the vehicle based on the output information of the sensor, and recognize that a peripheral environment of the vehicle is a travel-restricted section based on a distribution of detection point data in a first group (first group GL) including a plurality pieces of the detection point data on one side in a left-right direction of the vehicle in the peripheral region.

According to (1), since it is possible to recognize that the peripheral environment of the vehicle is the travel-restricted section based on the distribution of the detection point data, it is possible to recognize that the peripheral environment of the vehicle is the travel-restricted section without recognizing a type of the object. Since the recognition of the travel-restricted section can be performed without recognizing the type of the object, the travel-restricted section can be accurately recognized without being affected by a recognition accuracy when the object is recognized based on the detection point data.

(2) The control device according to (1), in which the processor classifies the first group into a plurality of first subgroups (first subgroups GL1 and GL2), and recognizes that the peripheral environment is the travel-restricted section based on a variation amount of positions of the plurality of first subgroups in the left-right direction.

According to (2), since the travel-restricted section is recognized based on the variation amount in the positions of the two first subgroups in the left-right direction, the recognition can be performed at high speed and with high accuracy.

(3) The control device according to (2), in which the plurality of first subgroups are different in position in a front-rear direction of the vehicle.

According to (3), since the travel-restricted section is recognized based on the variation amount of the positions of the two first subgroups in the left-right direction, the recognition can be performed at high speed and with high accuracy.

(4) The control device according to any one of (1) to (3), in which the processor further recognizes that the peripheral environment is the travel-restricted section based on a distribution of detection point data in a second group (second group GR) including a plurality pieces of the detection point data on another side in the left-right direction in the peripheral region.

According to (4), since the travel-restricted section is recognized based on the distribution of the detection point data in each of the first group and the second group, the recognition accuracy can be improved.

(5) The control device according to (4), in which the processor classifies the second group into a plurality of second subgroups (second subgroups GR1 and GR2), and recognizes that the peripheral environment is the travel-restricted section based on a variation amount of positions of the plurality of second subgroups in the left-right direction.

According to (5), since the travel-restricted section is recognized based on the variation amount of the positions of the two second subgroups in the left-right direction, the recognition can be performed at high speed and with high accuracy.

(6) The control device according to (5), in which the plurality of second subgroups are different in position in a front-rear direction of the vehicle.

According to (6), since the travel-restricted section is recognized based on the variation amount of the positions of the two second subgroups in the left-right direction, the recognition can be performed at high speed and with high accuracy.

(7) The control device according to any one of (1) to (6), in which the processor acquires, as the detection point data, detection point data (detection point group data DO) based on the past output information and detection point data (detection point group data DN) based on the latest output information.

According to (7), since the travel-restricted section can be recognized based on a large number of pieces of detection point data, the recognition accuracy thereof can be improved.

(8) The control device according to any one of (1) to (7), in which the sensor is a radar device (radar device 12).

(9) The control device according to any one of (1) to (8), in which the processor is configured to perform lane change control of the vehicle, and restrict the lane change control when it is determined that the peripheral environment is the travel-restricted section.

According to (9), for example, the lane change is not performed in the travel-restricted section, and safety can be improved.

The invention claimed is:

1. A control device that performs travel control of a vehicle, the control device comprising
 a processor configured to acquire output information of a sensor configured to detect an object in an around of the vehicle based on a reflected wave from the object, wherein
 the processor is configured to:
  acquire detection point data of the object in a peripheral region of the vehicle based on the output information of the sensor;
  recognize that a peripheral environment of the vehicle is a travel-restricted section based on a distribution of detection point data in a first group including a plurality pieces of the detection point data on one side in a left-right direction of the vehicle in the peripheral region;
  classify the first group into a plurality of first subgroups; and
  recognize that the peripheral environment is the travel-restricted section based on a variation amount of positions of the plurality of first subgroups in the left-right direction.

2. The control device according to claim 1, wherein the plurality of first subgroups are different in position in a front-rear direction of the vehicle.

3. The control device according to claim 1, wherein the processor is further configured to recognize that the peripheral environment is the travel-restricted section based on a distribution of detection point data in a second group including a plurality pieces of the detection point data on another side in the left-right direction in the peripheral region.

4. The control device according to claim 3, wherein the processor is configured to:
 classify the second group into a plurality of second subgroups; and
 recognize that the peripheral environment is the travel-restricted section based on a variation amount of positions of the plurality of second subgroups in the left-right direction.

5. The control device according to claim 4, wherein the plurality of second subgroups are different in position in a front-rear direction of the vehicle.

6. The control device according to claim 1, wherein the processor is configured to acquire, as the detection point data, detection point data based on past output information and detection point data based on latest output information.

7. The control device according to claim 1, wherein the sensor is a radar device.

8. The control device according to claim 1, wherein the processor is configured to:
 perform lane change control of the vehicle; and
 restrict the lane change control when it is determined that the peripheral environment is the travel-restricted section.

* * * * *